R. P. SAFFOLD.
SUBCALIBER ATTACHMENT FOR GUNS.
APPLICATION FILED SEPT. 3, 1913.
1,126,294.
Patented Jan. 26, 1915.
4 SHEETS—SHEET 3.
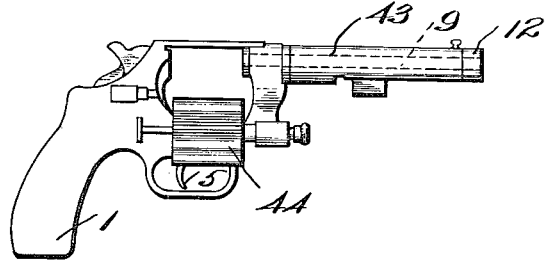
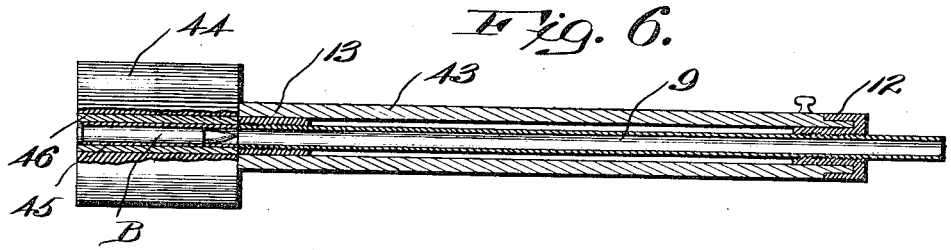
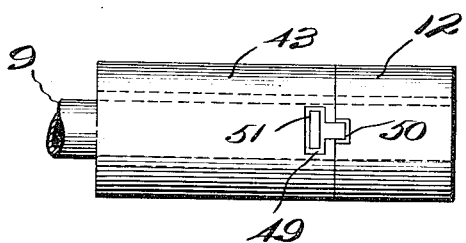
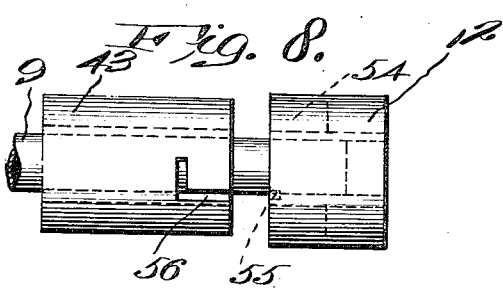
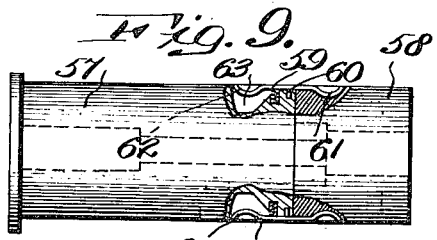
Witnesses
Edwin J. Beller
H. H. Byrne
Inventor
Ray P. Saffold
by Wilkinson, Guth, & Mackay
Attorneys.

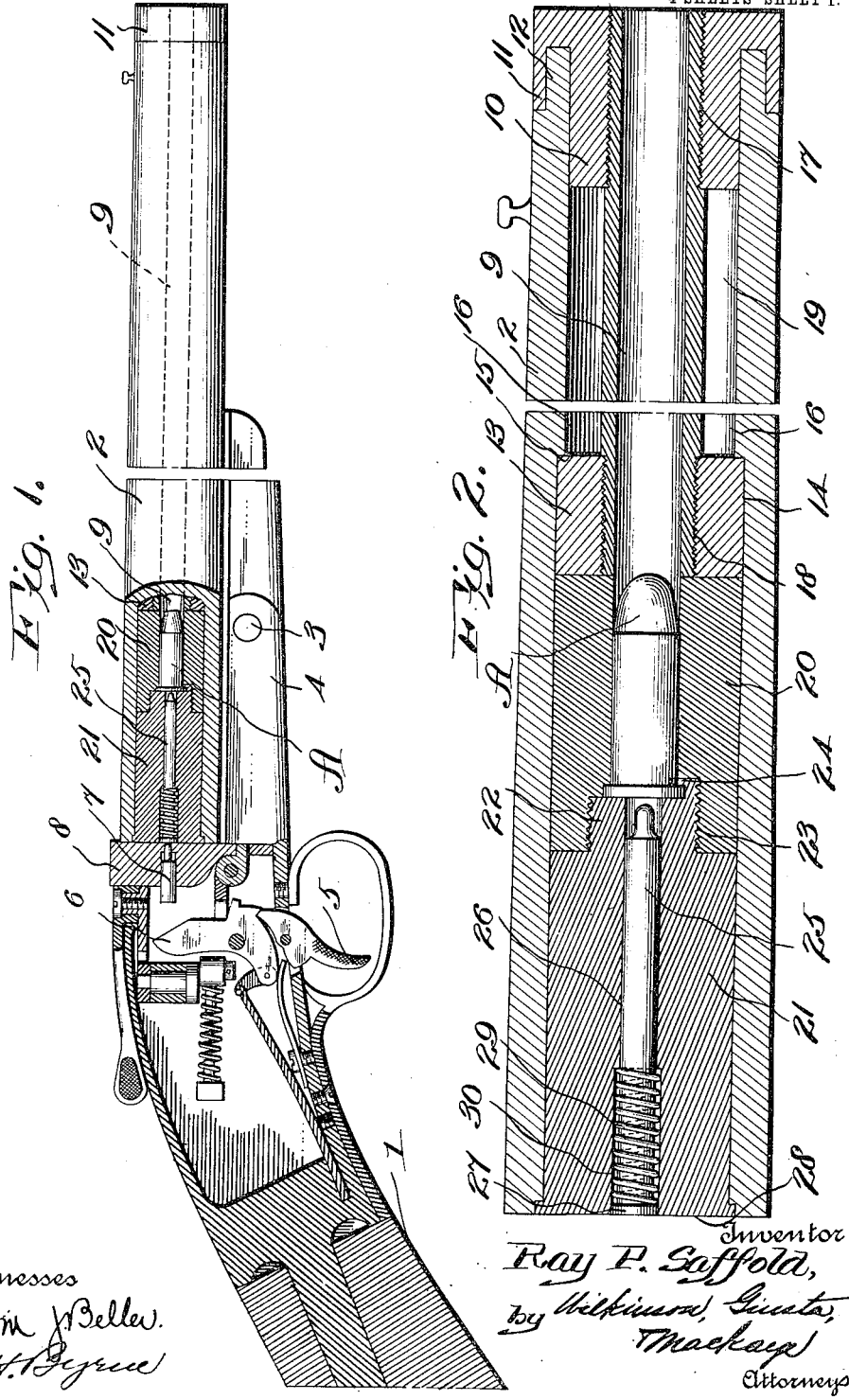

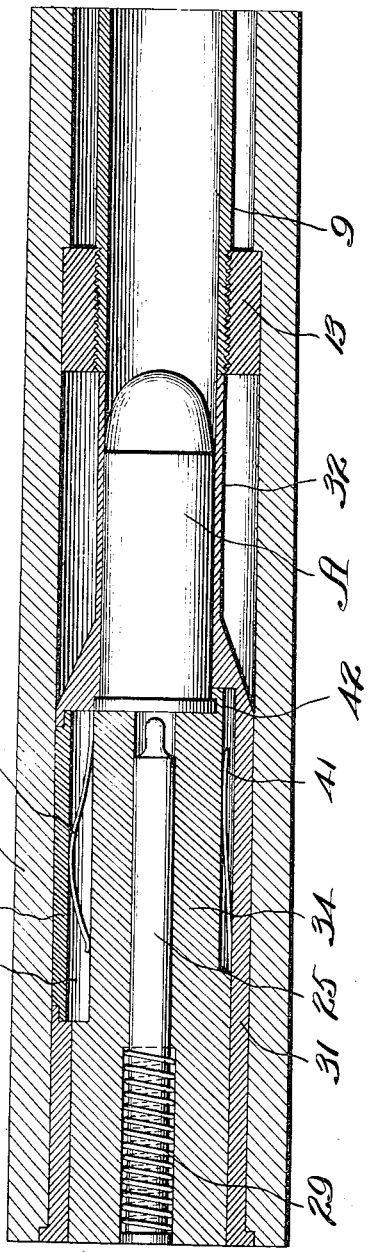
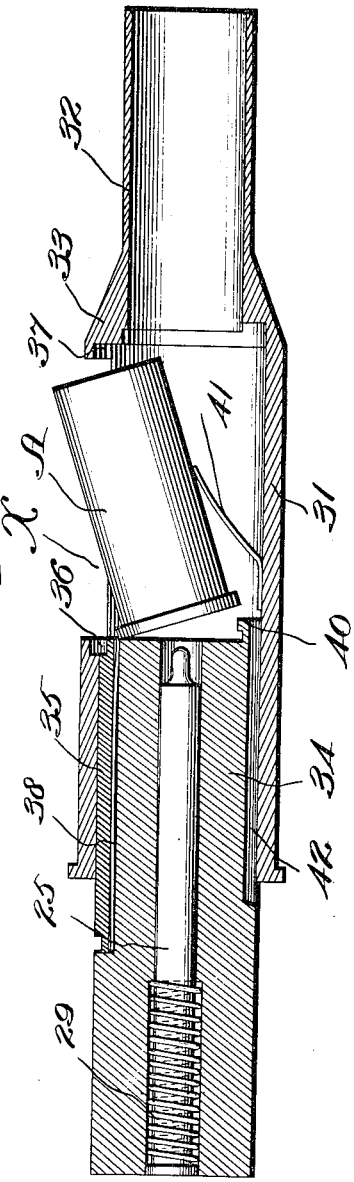

R. P. SAFFOLD.
SUBCALIBER ATTACHMENT FOR GUNS.
APPLICATION FILED SEPT. 3, 1913.
1,126,294.
Patented Jan. 26, 1915.
4 SHEETS—SHEET 4.
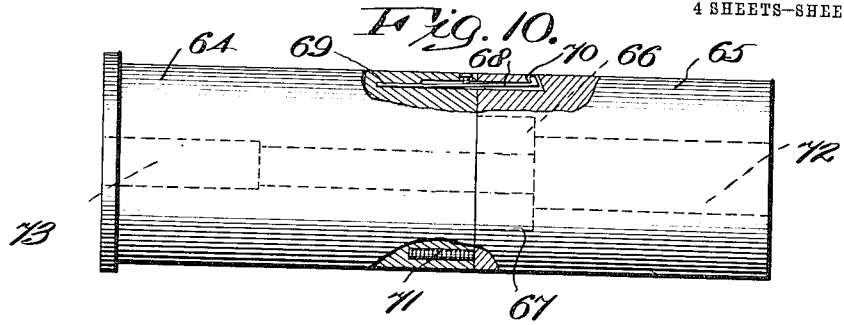
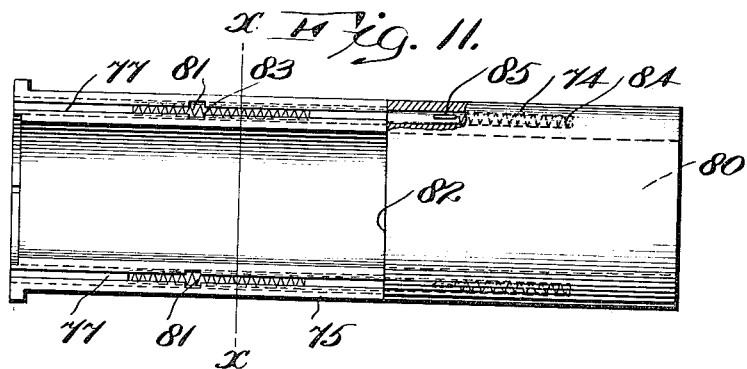
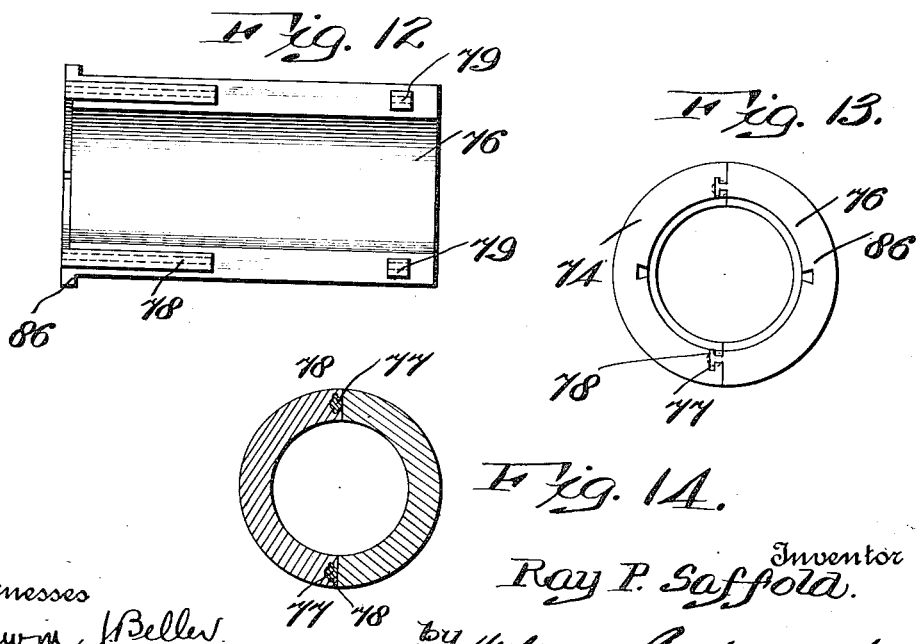

UNITED STATES PATENT OFFICE.

RAY P. SAFFOLD, OF SAN FRANCISCO, CALIFORNIA.

SUBCALIBER ATTACHMENT FOR GUNS.

1,126,294. Specification of Letters Patent. Patented Jan. 26, 1915.

Application filed September 3, 1913. Serial No. 787,931.

*To all whom it may concern:*

Be it known that I, RAY P. SAFFOLD, a citizen of the United States, residing at San Francisco, in the county of San Francisco and State of California, have invented certain new and useful Improvements in Subcaliber Attachments for Guns; and I do hereby declare the following to be a full, clear, and exact description of the invention, such as will enable others skilled in the art to which it appertains to make and use the same.

The present invention relates to firearms, and has for its purpose to provide a device whereby a gun, rifle, or other firearm of a given caliber may be adapted for sub-caliber use without altering the structure, and wherein the attachment may be readily affixed and removed from the gun barrel.

A further purpose of the invention is to provide an interchangeable arrangement of sub-caliber devices by which any gun or rifle of standard make may be equipped for firing a variety of shells or cartridges and of different sizes.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views: Figure 1 is a side elevation and part sectional view of a gun equipped with the present invention. Fig. 2 is a longitudinal sectional view, and on a larger scale, of the sub-caliber attachment. Fig. 3 is a view similar to Fig. 2 showing a modified construction. Fig. 4 is a view corresponding to Fig. 3, showing the position of parts when a shell is being ejected. Fig. 5 illustrates the application of the invention to a revolver. Fig. 6 is an enlarged longitudinal sectional view of the revolver attachment, showing the same in a modified structure. Fig. 7 is an elevational view of a modified form of tap for holding the auxiliary barrel to the revolver barrel at the muzzle end thereof. Fig. 8 illustrates another modified form of tap for securing the auxiliary barrel. Fig. 9 is an elevational view, partly in section, of a modified form of cartridge, or shell holder. Fig. 10 is a similar view of another form of cartridge or shell holder. Fig. 11 is a view of still another form of holder, and with a section thereof removed. Fig. 12 is an elevational view of the removed section. Fig. 13 is an end elevational view of the form of holder shown in Fig. 11 when the parts thereof are assembled; and Fig. 14 is a transverse sectional view taken on the line $x$—$x$ of Fig. 11.

Referring to the construction in further detail, and particularly to Figs. 1 and 2, 1 designates the stock of an ordinary gun or rifle having the usual barrel 2, which is hinged to break at 3 on the grip 4. The gun has the usual firing mechanism, including a trigger 5 adapted to release the hammer 6 for actuating the firing pin 7 mounted in the hinged block 8.

The sub-caliber attachment comprises an auxiliary barrel 9, mounted in the gun barrel 2 through the medium of a tap 10 that fits within the muzzle of the barrel 2, and has a flange or collar 11 fitting over the reduced end portion 12 of said barrel 2. And the second tap 13 fits within the enlarged bore 14 at the breech end of the barrel 2, and seats against the annular shoulder 15 at the normal bore 16 of the gun barrel. The auxiliary barrel 9 is screw-threaded at its respective ends 17 and 18 to engage with complementary threads formed on the muzzle tap 10 and the breech tap 13, respectively. The space or chamber 19 between the barrels and the taps is left free, to the end of avoiding excessive weight when the sub-caliber attachment is used, and to obtain in effect a cooling chamber or jacket for the auxiliary barrel, as will be understood.

The cartridge or shell holder comprises a sectional block or bolt which fits snugly within the breech end of the gun barrel 2, and is disposed against the breech end of the auxiliary barrel 9, at which point the shell or cartridge A enters said auxiliary barrel. The cartridge holder or bolt section 20 is bored to receive the shell or cartridge A, as illustrated in Figs. 1 and 2, and said bore is, of course, in accordance with the sub-caliber ammunition used, and likewise commensurable with the bore of the auxiliary barrel. The shell holder or bolt section 21 is detachably connected to the bolt section 20 by a head 22 screw-threaded into a recess 23 formed in the base of the section 20; and said head 22 is formed with a shell extractor 24 engaging with a flange of the shell as in the manner shown. With this arrangement it will be obvious that as the bolt sections 20 and 21 are separated the flange 24 will operate to withdraw the shell of the spent cartridge.

An auxiliary firing pin 25 is mounted to operate within the bolt section 21, for which purpose said section is bored, as at 26, and the base 27 of the auxiliary firing pin 25 lies normally flush with the base 28 of the bolt at the breech end thereof where it is engaged by the firing pin 7 of the gun. A spring 29 fits within the bore enlargement 30 and engages with the base 27 and normally holds the auxiliary pin in position for firing.

The bolt or shell and cartridge holder illustrated in Figs. 3 and 4 comprises a sleeve 31 that fits snugly within the gun barrel 2 from the breech end thereof, as with the bolt described above, and said sleeve 31 may be formed with a reduced and tubular extension 32 having a collar or flange 33. The cartridge or shell A fits within the tubular extension 32 abutting the auxiliary barrel 9, and at which point the projectile end of the cartridge enters the auxiliary barrel when fired. A block 34 is slidably mounted within the enlarged portion of the sleeve and is adapted to close against the sleeve flange 33 and hold the shell or cartridge for firing, as in Fig. 3; and to be withdrawn from that position to expel the fired shell with the aid of the ejector, as in Fig. 4. The sliding block 34 is provided with a depressible segmental section or plate 35 adapted to close the opening X in the sleeve 31 when the block 34 is forward and the gun ready for firing (see Fig. 3). The sleeve body 31 and the flange 33 are formed with recesses 36 and 37, respectively, to receive the movable plate 35 when the same is closed through the agency of the leaf spring 38 carried by the block 34. When the block 34 is withdrawn for the insertion of a cartridge, or expelling a spent shell, the plate 35 is adapted to be depressed within the recess 39 or within the limits of the opening in the sleeve 31, as illustrated by Fig. 4.

An extractor 40 is formed at the end, and as an integral part of the block 34 has for its function to engage with the flange of the shell and withdraw the same when the latter is forcibly ejected from the shell chamber by means of the spring 41 secured to the sleeve 31, and to accommodate which the under side of the block 34 is grooved or recessed, as at 42. An auxiliary firing pin 25 is carried by the block 34 and is adapted to be actuated after the manner described of the auxiliary firing pin aforesaid.

In adapting the device for use in connection with revolvers or pistols (see Figs. 5 and 6) the auxiliary barrel 9 is mounted within the pistol or revolver barrel 43 through the medium of the muzzle and breech taps 12 and 13, as in the case with the construction shown in Figs. 1 and 2. The auxiliary barrel may be co-extensive in length with the length of the revolver barrel, as in Fig. 5, or may project beyond the muzzle thereof, as in Fig. 6.

The revolving barrel 44 of the revolver is adapted to have its respective chambers holding the cartridges B brought into register with the breech end of the auxiliary barrel 9, as shown in Fig. 6. In this instance the bullet holder comprises a one-piece sleeve 45 fitting within the bore of the normal bullet holder 46 of the barrel 44.

In the arrangement shown in Fig. 7, the muzzle end of the auxiliary barrel has its tap 12 provided with one or more clips 49, that are hingedly mounted thereon at 50, and adapted to engage within complementary-formed grooves or recesses 51, formed in the muzzle end of the revolver barrel 43.

In the arrangement shown in Fig. 8, the cap of the auxiliary barrel carries a projection 55 designed to engage within a bayonet slot 56, formed in the muzzle end of the barrel 43.

In lieu of either of the arrangements shown and described for attaching the muzzle end of the auxiliary barrel, that form of device shown in Fig. 9 may be used, and in which case the member 58 would serve as the cap, which would be secured to the muzzle end of the firearm barrel through the medium of the spring clips 59.

In Fig. 9, the sections 57 and 58 of the cartridge holder are detachably secured together through the medium of a pair of spring clips 59 pivoted at 60 to the part 57, and having curved end portions 61 for engaging within complementary recesses formed in the member 58. The opposite ends 62 of the members 59 are adapted to be engaged by the fingers for releasing the ends 61, and the part 57 is recessed, as at 63, to accommodate the clip ends 62.

The cartridge holders in Figs. 1, 2, 3, 4 and 9 are each provided with an end flange $x$ adapted to be engaged by the shell extractor of the gun to draw said holder from the gun barrel when the breech is opened.

The shell or cartridge holder shown in Fig. 10 employs two sections 64 and 65, having a head and recess engagement 66 and 67 (similar to 22 and 23 of Figs. 1 and 2) and are detachably connected by clips 68 (one being shown) secured at 69 to the part 64 and engaging within openings 70 formed in the part 65. A number of springs similar to the spring 71 are mounted in the part 64 and engage with the abutting face of the member 65 and coöperate with the clips 68 to hold the sections in assembled relation. The member 65 is centrally bored, as at 72, to receive the shell or cartridge, and similarly the member 64 is bored, at 73, to receive the auxiliary firing pin.

In the construction shown in Figs. 11 to 13, inclusive, the cartridge or shell holder consists of a sleeve having a cylindrical portion 74 and a semi-cylindrical portion 75, the latter adapted to receive the segmental section 76 (see Fig. 12). The sleeve portion 75 is formed with a pair of channels or grooves 77 having slidably mounted therein a pair of strips 78 and a pair of heads 79, to the end that the member 76 may be withdrawn for the insertion of a new charge, or extraction of a spent one from the chamber 80 in the cylindrical portion 74 of the sleeve. A pair of springs 81 is mounted in the slots 77 and is adapted to engage with the heads 79 and hold the member 76 closed against the end 82 of the shell or cartridge holder 80, and permit of said member 76 being withdrawn, as above stated. A pair of openings or slot enlargements 83 form entries into the slots 77 to receive the sliding heads 79 of the member 76 when the sleeve sections are being assembled. In this latter instance the two springs 81 would be withdrawn or compressed within the slots 77, to the left of said openings 81, whereby to engage with the heads 79. A second pair of springs 84 is mounted within the slots 77 at the far ends thereof, and carry each a ring or clip 85 adapted to engage with the members 79 on the part 76 and serve to close the member 76 against the surface 82, and permit said member being withdrawn. The pair of springs 84 are provided to be used in the event of breakage or other derangement of the pair of springs 81. The movable sleeve section 76 is constructed with an internal flange or shoulder $y$ adapted to engage with the flange of the cartridge shell and act as an extractor when said section is moved. Said section is also formed with a flange 86 adapted to be engaged by the shell extractor of the gun when the breech is opened, on the usual breech opening operation of the gun.

The structure of parts and their manner of assembling, and mode of operation as disclosed in the drawings and described herein, produce an arrangement whereby any shotgun, repeating pump gun, or rifle of ordinary make may be adapted for firing shells or cartridges of any size smaller than those for which said firearms are constructed. The arrangement is such that the sub-caliber attachment to the firearm will not appreciably increase the weight thereof, and the parts may be conveniently applied or removed from the gun, or interchanged with other parts when it is desired to use ammunition of another kind or size.

The invention contemplates the employment of a variety of modifications or departures from those shown herein, to wit:—

*The auxiliary barrel.*—The barrel may be changed to obtain a bore in accordance with the bore of the cartridge or shell holder; and may be made of any length. To the last-named end it is proposed to construct the barrel in sectional lengths adapted for detachable connection, as will be understood. The barrel may likewise have a smooth or rifled bore, and is so mounted with respect to the cartridge or shell that it does not receive the ball of the latter until the instant of firing. By this provision no explosion takes place in the auxiliary barrel, consequently the latter is kept cooler and is at all times in proper condition for firing.

In addition to the foregoing my supplemental barrel may be used with any ammunition of its respective or a smaller caliber, so long as the cartridge or shell holders are of the proper type for holding such ammunition.

*The ammunition holder or bolt.*—This feature of the invention is capable of having many different designs. Thus, in addition to the precise arrangement shown in Figs. 11 to 13, the slidable section of the sleeve may be in the form of a segment less than the semi-cylindrical part shown. Thus it may have the form of a quadrant, or again the slidable piece may be in the form of a block movably mounted on the main portion of the cylinder.

Instead of constructing the ammunition holder in sections it may be formed as a single piece, which would adapt the same to hold cartridges of the long or bottle-neck type. In this event, *i. e.* when long cartridges are being used, the auxiliary firing pin would be dispensed with since the flange of the cartridge to be fired would be in proper position to be engaged by the firing pin proper of the gun. In like manner, a cartridge holder of the one-piece type would serve where the cartridges or shells were such that the same would fit in the base of the holder. In this instance the supplemental barrel would, of course, need to be of a diameter corresponding to the caliber of such cartridge or shell. A further alternative form of the one-piece holder is that wherein the cartridge projects through the muzzle end of the holder, and the holder itself contains a member carrying the auxiliary firing pin.

The cartridge or shell holder may, in certain instances, be used without the auxiliary barrel. Thus, as an instance, a 16 gage shot-gun shell could be used in a 12 gage pump gun.

The particular means shown for securing the parts, when the shell holder is in sectional form, may be departed from and a variety of other forms of attachment employed. A pair of spring arms having half-arrow heads could be carried by one of the members and have sliding engagement with slots or an annular groove formed in the other member.

*The auxiliary firing pin.*—This pin may be of the form shown in the drawings or may have its cartridge engaging end constructed to contact with the rim of the cartridge, or at a point thereon, or such other design as may be deemed appropriate.

*The auxiliary barrel securing means.*— The taps for securing the auxiliary barrel at the muzzle and breech ends thereof may have any desired form other than that shown, but it is preferred to have the second-named tap to engage with the barrel and itself be secured to the auxiliary barrel, in a manner which permit of the auxiliary barrel being inserted or removed from the gun barrel only through the breech end of the gun barrel. In applying the taps to a double barrel shot-gun, it will, of course, be necessary to have slight cuts made between the barrels at the muzzle, so as to allow the muzzle taps to encircle and thread or otherwise be attached to the muzzle end of the gun barrel.

The taps are designed to be of standard gage for holding the different barrels, which would likewise be of corresponding gage since the interchangeable sub-caliber arrangement is provided for by having the auxiliary barrels formed with different size borings. It is further proposed to provide the muzzle end of the gun barrel with a separate attachment to which the muzzle tap of the auxiliary barrel would be secured. The muzzle tap which supports the outer end of the auxiliary barrel may be dispensed with entirely if the gun barrel is provided with a flange of the proper proportions to hold the auxiliary barrel.

It is obvious that those skilled in the art may vary the details of construction and arrangement of parts without departing from the spirit of my invention, and therefore I do not wish to be limited to such features except as may be required by the claims.

I claim—

1. The combination of a gun barrel having an interior shoulder at its rear and a reduced muzzle end; an auxiliary barrel having screw threads at each end; a rear tap fitting the interior of said gun barrel, resting against said shoulder, and screwed to the rear end of said auxiliary barrel; a muzzle tap fitting the interior of said gun barrel, screwed to the muzzle end of said auxiliary barrel, and provided with a flange fitting the exterior of the reduced muzzle end of said gun barrel; a cartridge holder fitting the interior of said gun barrel in the rear of said shoulder and abutting against said first mentioned tap; and an auxiliary firing pin carried by said holder adapted to be actuated by the firing pin of the gun, substantially as described.

2. The combination of a gun barrel having an interior shoulder at its rear and a reduced muzzle end; an auxiliary barrel having screw threads at each end; a rear tap fitting the interior of said gun barrel, resting against said shoulder, and screwed to the rear end of said auxiliary barrel; a muzzle tap fitting the interior of said gun barrel, screwed to the muzzle end of said auxiliary barrel, and provided with a flange fitting the exterior of the reduced muzzle end of said gun barrel; a cartridge holder fitting the interior of said gun barrel in the rear of said shoulder and abutting against said first mentioned tap, said cartridge holder comprising two sections screw threaded together; an extractor carried by the rear section of said cartridge holder; and an auxiliary firing pin carried by said holder adapted to be actuated by the firing pin of the gun, substantially as described.

3. The combination of a gun barrel having an enlarged interior and an interior shoulder at its rear; an auxiliary barrel screw threaded at each end; a rear tap fitting said enlarged interior, abutting said interior shoulder, and screw threaded to the rear edge of said auxiliary barrel; a forward section of a cartridge holder fitting said enlarged interior and resting against the rear ends of said auxiliary barrel and rear tap, said forward section being provided with an enlarged bore to accommodate the cartridge and a screw threaded recess at its rear; a rear section of a cartridge holder fitting said enlarged interior, abutting the rear end of said forward section, and provided with a longitudinal bore and a screw threaded head fitting said recess; an auxiliary firing pin in said longitudinal bore adapted to be actuated by the firing pin of the gun, and a muzzle tap screw threaded to the muzzle end of said auxiliary barrel and fitting the interior of said gun barrel, substantially as described.

4. The combination of a gun barrel, provided with a reduced muzzle end terminating in an exterior shoulder, and having an enlarged interior and an interior shoulder at its rear; an auxiliary barrel screw threaded at each end; a rear tap fitting said enlarged interior, abutting said interior shoulder, and screw threaded to the rear end of said auxiliary barrel; a forward section of a cartridge holder fitting said enlarged interior and resting against the rear ends of said auxiliary barrel and rear tap, said forward section being provided with an enlarged bore to accommodate the cartridge and a screw threaded recess at its rear; a rear section of a cartridge holder fitting said enlarged interior, abutting the rear end of said forward section and provided with a longitudinal bore and a screw threaded head fitting said recess; a cartridge extractor carried by said screw threaded head; an auxiliary firing pin in said longitudinal bore adapted to be actuated by the firing pin of the gun; and a muzzle tap provided with an exterior flange member fitting said reduced muzzle end and abutting said exterior shoulder, said muzzle tap also provided with an interior member screw threaded to the muzzle end of said auxiliary barrel and fitting the interior of said gun barrel, substantially as described.

5. The combination of a gun barrel having an interior shoulder at its rear and a reduced muzzle end; an auxiliary barrel having screw threads at each end; a rear tap fitting the interior of said gun barrel, resting against said shoulder, and screwed to the rear end of said auxiliary barrel; a muzzle tap fitting the interior of said gun barrel screwed to the muzzle end of said auxiliary barrel, and provided with a flange fitting the exterior of the reduced muzzle end of said gun barrel; and a cartridge holder fitting the interior of said gun barrel in the rear of said shoulder and abutting against said first mentioned tap, substantially as described.

In testimony whereof, I affix my signature, in presence of two witnesses.

RAY P. SAFFOLD.

Witnesses:
JOSEPH SLYE,
L. R. WATERHOUSE.